United States Patent [19]

Kauss

[11] Patent Number: 5,095,697
[45] Date of Patent: Mar. 17, 1992

[54] CONTROL CIRCUIT FOR LIFT DRIVEN BY VARIABLE DISPLACEMENT PUMP

[75] Inventor: Wolfgang Kauss, Lohr-Wombach, Fed. Rep. of Germany

[73] Assignee: Mannesmann Rexroth GmbH, Lohr/Main, Fed. Rep. of Germany

[21] Appl. No.: 575,705

[22] Filed: Aug. 30, 1990

[30] Foreign Application Priority Data

Sep. 5, 1989 [DE] Fed. Rep. of Germany ....... 3929466

[51] Int. Cl.$^5$ .................... F15B 11/08; F15B 13/02
[52] U.S. Cl. .................................. 60/452; 91/445; 91/447; 91/461
[58] Field of Search .............. 60/445, 452; 91/445, 91/446, 447, 461

[56] References Cited

U.S. PATENT DOCUMENTS

| | | | |
|---|---|---|---|
| 4,667,570 | 5/1987 | Jensen et al. | 91/446 X |
| 4,813,235 | 3/1989 | Miller | 60/445 X |
| 4,960,035 | 10/1990 | Kauss | 91/447 X |
| 4,967,554 | 11/1990 | Kauss | 60/452 |

Primary Examiner—Edward K. Look
Assistant Examiner—George Kapsalas

[57] ABSTRACT

Described is a control circuit for a hydraulic power lift driven by a displacement pump which has a check valve releasable at least for lowering movements of the power lift, a actuation means switching the check valve off and on to control the flow from a pump line into an operating line leading to the power lift and vice-versa, and a load-sensing line carrying the load pressure and connected to the operating line, by which the variable-displacement pump is capable of being activated. The actuating means has an actuating unit switching the check valve off and on and a servo valve, activated simultaneously and controlling the flow to and from the power lift, with at least three switch positions. In the starting position of the actuating means, the latter connects the load-sensing line and the operating line, by way of the servo valve, with the tank and, after passage through a central position, the operating line with the pump line. To provide that on connection and disconnection of the pilot pressure outside of the neutral position of the servo valve, pressure reactions occur in the operating line downstream of the shut-off block, the actuating unit has two actuation sides opposing one another, of which the actuation side acting on the check valve in closing direction is relieved in the end positions of the control spool of the servo valve. There is in addition provided a pressure-equalizing means which, in the central position of the servo valve, provides that the pressures on the two actuation sides may be equalized with a time delay.

12 Claims, 2 Drawing Sheets

CONTROL CIRCUIT FOR LIFT DRIVEN BY VARIABLE DISPLACEMENT PUMP

BACKGROUND OF THE INVENTION

The invention concerns a control circuit for a hydraulic power lift drive by a displacement pump.

Already known is a control circuit for a hydraulic power lift driven by a displacement pump, having a check valve releasable at least for lowering movements of the power lift, a load-sensing line carrying the load pressure and an actuation means switching the check valve off and on, which controls the flow from a pump line into an operating line leading to the power lift and/or from the power lift into a tank line leading to the tank.

In such a control circuit, there is provided a servo valve which by one control edge actuates the check valve or the shut-off block, via another control edge acts on a hydraulic component which switches the displacement pump feeding a hydraulic system into a variety of operating conditions, by still another control edge with a variable opening surface controls a pump feed flow between a pump line and a consumer line leading to the power lift, in which the shut-off block is seated, and by a fourth control edge with a variable opening area controls a relief oil flow between the service line and a tank line.

This conventional control circuit was required for hydraulic systems fed by constant displacement pumps, since in such systems, in the neutral position of the servo valve the constant displacement pump had to be switched off and the shut-off block closed in order to keep power losses as small as possible. Such a control circuit is likewise used for hydraulic systems which are increasingly operated with variable displacement pumps for further reducing power losses.

The servo valve therefore has a switching and a flow-controlling function, so that there is necessarily a linkage of these two functions in the servo valve. This results in the problem of optimizing the dynamics and the accuracy of the control circuit despite such linkage of the two functions.

For this purpose, a control circuit pursuant is disclosed in DE-OS 3733679. Use of the displacement pump in conjunction with the actuating means permits the switching functions of the control circuit to be separated from the flow-controlling functions in such fashion that a good response behavior of the control circuit is produced, more particularly, the disadvantage of an initially gradual pressure buildup in the consumer line upon its activation is avoided. This control circuit therefore offers opportunities for reacting variably to a variety of operating requirements demanded of the power lift. If accuracy and rapidity of reaction are required, the variable displacement pump is driven in the load-sensing mode and the shut-off block remains open. In operating phases with low demands, for example, when driving a vehicle under load, outfitted with a hydraulic power lift, the variable displacement pump may be switched into so-called standby operation by connection of the load-sensing line to the tank pressure level, where the shut-off block is automatically closed and the load thereby secured. Since the variable displacement pump is always switched to load pressure before the shut-off block opens, at a high load pressure pilot actuation of the shut-off block may alternatively be eliminated. This means that design of the shut-off block may be made much less costly structurally, since various additional hydraulic control lines and elements of the conventional control circuit are no longer required. At the same time, the linkage of load-sensing operation with actuation of the shut-off block without recourse to pilot actuation automatically results in a safety function for controlled and regulated hydraulic systems with a mass load. Since the pilot pressure level is low in comparison to the load pressure, lowering of a heavy load can always take place only in the neutral position of the servo valve. The sudden or brief drop of a heavy load on startup of the control circuit is therefore likewise precluded when, for any reason, the servo valve inadvertently stands or stood in its lowered position. In this connection, it is possible to carry out flow control by the servo valve and the switching function, through which release of the check valve or the shut-off block is effected, by means of a single pilot pressure, a partial region of the pilot pressure spectrum preferably being reserved for the switching function and it being provided that, at a low pilot pressure level, the actuating unit responds as the servo valve.

SUMMARY OF THE INVENTION

According to the disclosed invention the known control circuit has the power lift with a simplified design of the control circuit, while separation of the switching functions of the control circuit from the flow-controlling functions offers the opportunity to set variable priorities in different operating phases of the power lift. Thus, for example, in operating phases with low requirements, for example when driving a vehicle under load equipped with a hydraulic power lift, the displacement pump can be switched to standby operation by connecting the load-sensing line to the tank, whereupon the shut-off block is automatically closed and the load accordingly secured. If accuracy and rapidity of reaction are required, the variable displacement pump is driven in the load-sensing mode and the shut-off block remains open.

However, in this known control circuit only optimized adjustment of the control characteristic of the servo valve on the one hand and of the actuating unit 30 on the other to the check valve allows reactions in the operating line downstream of the check valve to be restricted when the pilot pressure in the neutral position of the servo valve is cut off. Such reactions when the pilot pressure is switched on and/or off outside of the neutral position of the servo valve may have adverse effects on safety. The object of the invention is therefore to refine the control circuit so as to provide, by as simple as possible circuit-technology measures, such that when the pilot pressure is switched on and off outside of the neutral position of the servo valve, reactions in the operating line downstream of the check valve are prevented without thereby negatively influencing the mode of operation of the check valve itself.

Pursuant to the invention, the actuating unit receives two actuating sides, opposing one another, which are coupled together by a pressure-equalizing means. Owing to the fact that the pressure-equalizing means in the central position of the servo valve provides that the pressures on the two actuating sides are equalized, with a time delay, when the servo valve is held in the neutral position for any length of time the restoring springs of the check valve seat the associated valve element with a speed of actuation which is predetermined by the characteristic of the pressure-equalizing means. Sudden cut-off of the pilot pressure for the servo valve and simultaneous sudden cut-off of the pilot pressure of the actuating unit enables the whole unit to be brought into the cut-off state without pressure reactions taking place in the operating line downstream of the check valve, in other words, without oil being able to escape from this operating line to the tank. It is simultaneously provided that upon rapid passage through the central position of the servo valve the valve element of the check valve remains lifted, because damping in the buildup of pressure in the actuating side acting in the direction of closing of the check valve is effected by way of the pressure-equalizing means. Therefore the load-sensing line remains at load pressure even with rapid passage through the central position of the servo valve. In this connection, it is of additional advantage that there is no continuous pilot oil consumption in the working positions of the servo valve, owing to which energy can be saved.

An especially advantageous developement and, more particularly, an additional reduction in circuit and device technology expense are obtained where simultaneous activation of the actuating unit and the servo valve, is effected by a common control line. Appropriate selection of the geometries of the valve body of the servo valve on the one hand and of the actuating unit on the other make it possible to provide that, with a single control signal, the displacement pump is always switched to load pressure before the shut-off block opens. In addition, the service line can additionally be secured against pressure loss by suitable selection of the speed at which the control signal is built up.

An advantageous variant of the pressure-equalizing means is realized for only a very low circuit-technology expense is required in this case, this being particularly so when the servo valve also takes over the function of the valve of the pressure-equalizing means.

The throttle provides for the abovementioned delayed pressure buildup on the actuation side acting on the check valve in closed position. As compared to the control circuit according to own older patent application P 39 11 022.2, this embodiment has the advantage that continuous pilot oil consumption is present exclusively in the central position of the pilot oil flow may alternatively be eliminated in the central position.

It has been shown that a pilot pressure signal of sufficient quality may advantageously be made available by an electrically activated pressure-regulating valve by dividing the range of input current of this pressure regulating valve up into predetermined regions in which the various types of operation of the control circuit can be maintained. Thus, it is possible, for example, to utilize the time delay of the check valve for the servo valve to reach the neutral position fast enough before the load pressure on the servo valve becomes detectable.

BRIEF DESCRIPTION OF THE DRAWINGS

A number of examples of the invention are explained in detail below, with the aid of schematic drawings, wherein.

DETAILED DESCRIPTION OF THE INVENTION

Figure 1:
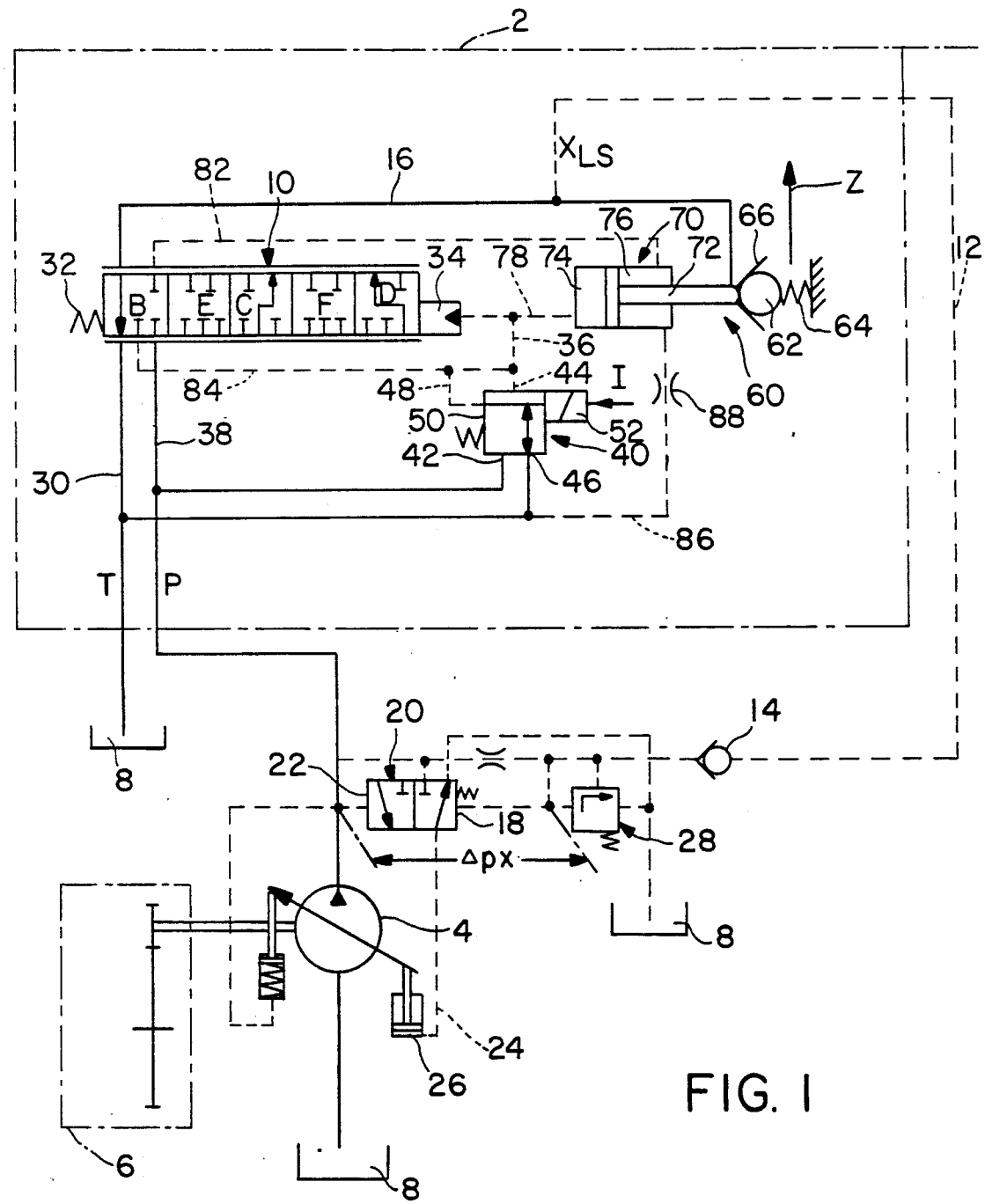
FIG. 1 shows a first embodiment of the control circuit of the present invention.

In FIG. 1 there is shown a hydraulic circuit with a control circuit 2 for controlling a hydraulic power lift, not represented, to which a consumer line Z leads. The hydraulic circuit is supplied by a variable displacement pump 4, which is driven by way of a gear 6 and draws flow medium from a tank 8. A differential pressure-regulating means is provided which provides that the pressure difference $\Delta_{px}$ across a 5/5 servo valve 10 remains constant. The hydraulic circuit accordingly works on the so-called load-sensing or flow compensation principle, wherein the flow is load-independently metered by way of the opening area of the control edge of the servo valve.

For this purpose, there is provided a load-sensing line 12 which branches off from an operating line 16 downstream of the servo valve 10 and is guided by way of a return valve 14, opening to the operating line 16, to a spring side 18 of a 3/2 servo valve 20, whose control side 22 turned away from the spring side is acted on by the pump pressure P upstream of the servo valve 10. The 3/2 servo valve controls the pressure in a control line 24 to a displacement cylinder 26 of the variable displacement pump 4, in order to control the displacement of the pump 4 according to the flow requirements of the consumer Z. The reference numeral 28 designates a pressure-limiting valve which safeguards the hydraulic circuit against excess pressure.

FIG. 1 shows the operation of the variable displacement pump 4 in so-called "standby operation," in which the load-sensing pressure $X_{LS}$ lies below a threshold value. This is attributable to the fact that the load-sensing line $X_{LS}$ is connected to the operating line 16, which in the starting position B of the 5/5 servo valve 10 is connected to a tank line 30.

The 5/5 servo valve 10 of the control circuit 2 is held in the starting position B by a spring 32. The control spool of the servo valve 10 has, on the side turned away from the spring 32, an adjusting member 34, through the actuation of which the control spool of the servo valve 10 is displaceable, by way of a switching position E, into a neutral or central position C and from there, by way of an additional switching position F, into the other end position D, against the force of the spring 32.

A control line 36, which represents the starting pressure line of an electrically activated pressure-regulating valve 40, serves for acting on the adjusting member 34. The pressure-regulating valve 40 has an input connection 42 connected to the pressure line 38 leading to the pump pressure P, an output connection 44 and a tank connection 46. Label 48 designates the pressure-return line, which acts on a spring control side 50 which opposes the electrically actuated adjusting member 52 of the pressure-regulating valve 40. The control current is indicated by I. Between the operating line 16 and the consumer line Z sits a shut-off block 60 which has a valve element 62 which is pressed against a valve seat 66 by means of a spring 64 for blocking the consumer line Z.

An actuating unit 70, designed as a piston cylinder arrangement whose actuating piston 72 divides the interior of the cylinder into a first and a second actuating chamber 74 and 76, serves for releasing the shut-off block 60. The first actuating chamber is connected to the control line 36 by way of a branch control line 78. A first pressure-equalizing line section 82, which is carried by way of the 5/5 servo valve 10, leads to the second actuating chamber 76. A second pressure-equalizing line section is labeled 84 and branches off from the common control line 36. It can be seen from the drawing that the two pressure-equalizing line sections 82 and 84 are in communication in the neutral position C of the 5/5 servo valve 10 but are otherwise separated from one another.

A relief line 86, which is connected to the tank line 30, serves for relieving pressure in in the second actuating chamber 76. A throttle 88, whose function will be explained in detail below, is provided in the said relief line 86.

Figure 3:
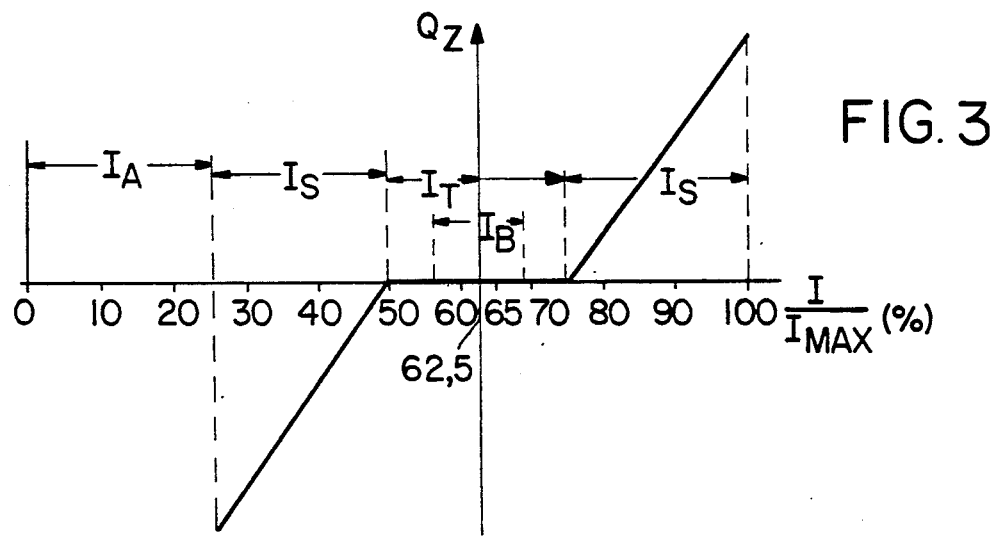
FIG. 3, is a diagram in which the flow through the servo valve is plotted against the variation of the control current, referred to the maximum control current, of an electrically activated pressure-regulating valve.

It is apparent from FIG. 1 that in the starting position B the tank line 30 is connected with the operating line 16 and the other connections are closed. In the intermediate position E, all connections are closed. In the neutral or central position C, the two pressure-equalizing line sections 82 and 84 are connected through. In the next intermediate position F, all connections are again closed. In the end position D which, for example, corresponds to the lifting position of a power lift, the pressure line 38 is connected through to the operating line 16, whereas the remaining connections are closed. This results in the following mode of operation of the control circuit:

In its starting position B, the load-sensing line 12 is connected to tank and is thus relieved, so that the variable displacement pump works in standby operation. The starting position B of the 5/5 servo valve 10 is maintained by the spring 32 so long as the pressure in the control line 36 does not exceed a first limiting threshold value. The shut-off block 60 remains closed due to the effect of the spring 64. The threshold pressure value in the control line 36 is set so that, up to a control current I, which corresponds to about 25% of the maximum control current $I_{max}$, it is not exceeded. This is indicated by the starting current magnitude $I_A$ in FIG. 3.

Figure 4:
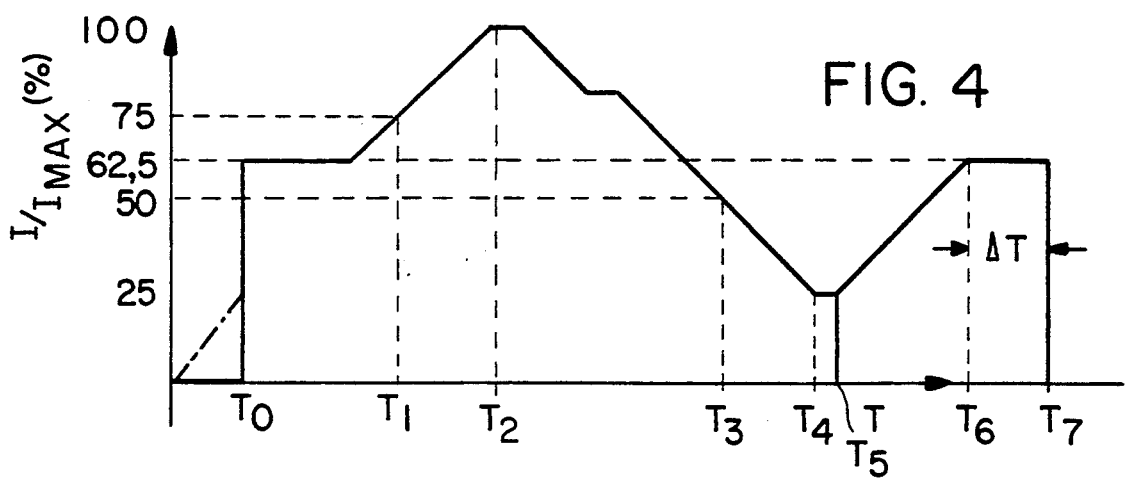
FIG. 4, is a diagram for representing the path of the control current in the various modes of operation of the control circuit.

To obtain the electrohydraulic neutral position C of the servo valve 10, the control current I is suddenly raised to about 62.5% of the maximum current $I_{max}$, which in FIG. 4 is indicated for the time $T_O$. As may be seen in FIG. 3, in a control current region $I_T$ of between 50% and 75% of the maximum current $I_{max}$, no flow to and from the consumer Z is yet controllable. The hydraulically actuated check valve 60 only opens at a control current $\geq$ 75% of the maximum control current $I_{max}$ and then remains open. The throttle 88 in the relief line 86 controls or limits the speed of hydraulic actuation of the shut-off block 60. This prevents the shut-off block 60 from closing in case of rapid passage through the control current region $I_B$ (see FIG. 3). However, within a control current region I, the servo valve 10 in the position C of course effects closing of the shut-off block 60 whenever the central position C is assumed long enough. This is due to the coupling of the two pressure-equalizing line sections 82 and 84 provided in the central position C, by way of which a time-delayed pressure equalization of the two actuation chambers 74 and 76 of the actuating unit 70 is effected.

In FIG. 4, T1 indicates the time at which the shut-off block 60 is opened. At control current values of between 75% and 100% of the maximum control current $I_{max}$, a flow-control function with a direction of flow to the consumer Z takes place, while in a control current region of between 25% and 50% a flow-control function with return flow of flow medium from the consumer Z takes place. T3 in FIG. 4 represents the time at which the return flow from the consumer Z begins. As already indicated above, it is important to design the speed of passage through the flow control region I between 75% and 50% so fast that the pressure equalization in the two actuation chambers 74 and 76 cannot yet take place at this time, so that the valve element 62 remains in the lifted-off position.

The shut-off block 60 remains open until the time T7 in FIG. 4. The time span $\Delta T$ between T6 and T7 is sufficiently long to bring about an equalization of pressure on the two actuation sides of the actuating piston 72. Therefore the shut-off block 60 goes into the closed position, outside of which the control current I can be shut off without flow from the load Z to the tank. In this way, reactions in the consumer line Z when the pilot pressure in the control line 36 is switched off and on may be prevented with a relatively small expense in circuit technology.

Figure 2:
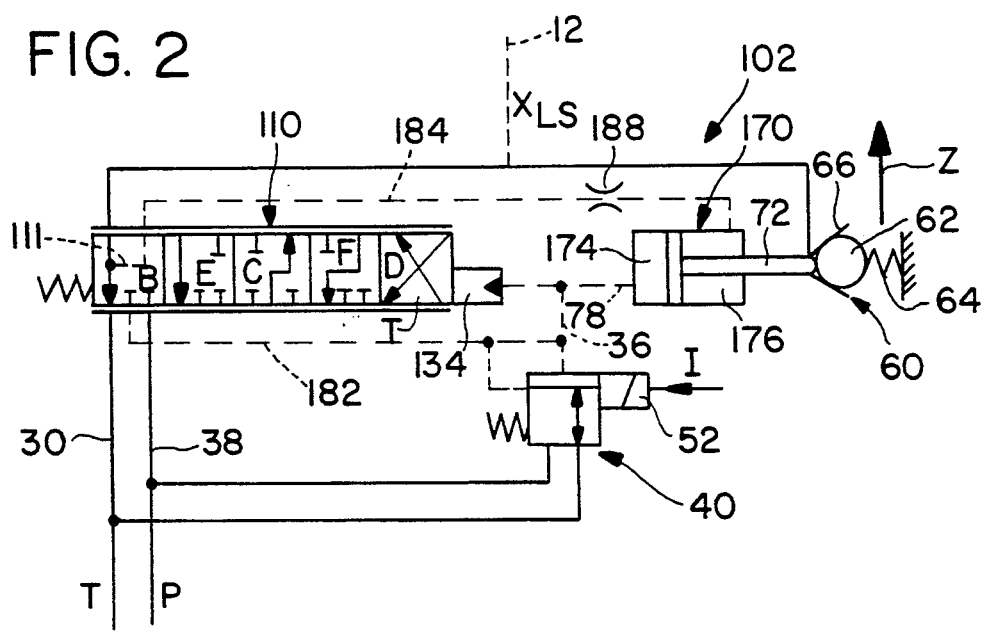
FIG. 2, shows another embodiment of the control circuit.

The embodiment described above has the particular additional advantage that continuous pilot oil consumption is present only in the central position C of the servo valve 10. In comparison to earlier proposals (cf. older patent application P 3911022.2), this control circuit works with little consumption of energy. The throttle 88 in this case limits the consumption of pilot oil and defines the speed of actuation of the shut-off block 60. To be able to optimize the pressure-equalizing means exclusively with regard to limitation of the speed of actuation of the shut-off block actuating piston and further reduce pilot oil consumption, the embodiment of FIG. 2 is provided. For purposes of simplification, only the control circuit, which is provided with the reference number 102, is shown in this representation. In this embodiment, the function of the throttle 88 of the embodiment of FIG. 1 is assumed by an additional control edge 111 of the 5/5 servo valve 110, which in turn produces a connection of the two pressure-equalizing line sections 182 only in the central position C. To permit an equalization of pressure in the actuation chambers 174 and 176 upon activation of the connection between the two pressure-equalizing sections 182 and 184 only with a time delay, a throttle 188 is incorporated into the pressure-equalizing section 184 downstream of the servo valve 110. Otherwise the control circuit corresponds to that of FIG. 1, which is expressed by the assignment of identical reference numerals to the pressure-regulating valve 40, the shut-off block 60 and the load-sensing line 12. In this embodiment the throttle 188 can be optimized exclusively for limiting the speed of actuation of the shut-off block actuating piston 72. Otherwise the mode of operation conforms to that of the embodiment of FIG. 1, so that, to simplify the description, no more will be said separately on this subject.

Differing from the embodiment shown, it is possible to place the pilot pressure for the control member 34 or 134 and the actuation chamber 74 or 174 at different levels only when the supply of pressure is effected simultaneously. Lastly, it is in addition possible to use a 5/3 servo valve instead of a 5/5 servo valve.

Therefore the invention procures a control circuit for a hydraulic power lift driven by a displacement pump which has a releasable check valve at least for lowering movements of the power lift, an actuation means switching the check valve off and on to control the flow from a pump line into an operating line leading to the power lift and vice-versa, and a load-sensing line, carrying the load pressure and connected to the operating line, which is capable of being activated by the variable displacement pump. The actuation means has an actuating unit switching the check valve off and on and a servo valve, with at least three positions, activated simultaneously and controlling the flow to and from the power lift. In the starting position of the actuation means, the latter connects the load sensing line and the operating line, by way of the servo valve, with the tank and, after passage through a central position, the operating line with the pump line. To provide that upon connection and disconnection of the pilot pressure outside of the neutral position of the servo valve pressure reactions occur in the operating line downstream of the shut-off block, the actuating unit has two actuation sides opposing one another, of which the actuation side acting on the check valve in the direction of closing is relieved in the end positions of the control spool of the servo valve. In addition, there is provided a pressure-equalizing means which, in the central position of the servo valve, provides that the pressures on the two actuation sides can be equalized, with a time delay. Various modifications in structure and/or function may be made by one skilled in the art to the disclosed embodiments without departing from the scope of the invention as defined by the claims.

I claim:

1. A control circuit for a hydraulic power lift driven by a variable displacement pump having a check valve releasable at least for lowering movements of the power lift comprising:

a load-sensing line means for carrying the load pressure and connected to an operating line leading to the power lift by which the variable displacement pump is capable of being activated;

actuation means having an actuating unit means for switching the check valve off and on and simultaneously activating a servo-valve having at least three positions for controlling the flow to and from the power lift, wherein the servo-valve in its starting position connects the load-sensing line means and the operating line with a tank and, after passing through a central or blocking position, connects the operating line with the pump;

the actuating unit means comprising first and second actuation sides opposing one another, of which the first actuation side acting upon the check valve in the closing direction is pressure-relieved in the end positions of the servo-valve; and pressure-equalizing means, which in a central position of the servo-valve, provides time-delayed equalizing pressure on the first and second actuation sides.

2. The circuit according to claim 1 wherein the servo-valve and the actuation unit means, on the second side acting on the check valve in the opening direction, are activated by a common control line.

3. The circuit according to claims 1 or 2 wherein the pressure-equalizing means has a pressure-equalizing line connecting the opposing actuation sides, the pressure-equalizing line being divided into two line sections by a valve, the two line sections being connected together in the central position of the servo-valve.

4. The circuit according to claim 3 wherein a throttle means is located in the pressure-equalizing line, and the line section downstream of the valve, which is connected with the first actuation side, is relieved to the tank in the starting position of the servo-valve and after the servo-valve passes through the central position.

5. The circuit according to claim 4 wherein the throttle means is arranged in the line section downstream of the valve.

6. The circuit according to claim 4 wherein said first actuation side has a constant connection to the tank via a discharge line integrated with the throttle means.

7. The circuit according to claim 3 wherein the valve and the servo-valve are integrated.

8. The circuit according to claim 7 wherein the servo-valve is a five-position five way servo-valve.

9. The circuit according to claim 3 wherein the control line is an output line of an electrically activated pressure-regulating valve.

10. The circuit according to claim 9 wherein a sudden rise to a predetermined level in a control current of the pressure-regulating valve causes the servo-valve to shift from the starting position into the central position.

11. The circuit according to claim 10 wherein a threshold control current region of about 25% of a maximum control current is reserved for the release of the check valve and the central position of the servo-valve is obtained with the control current value of about 62.5% of the maximum control current, the servo-valve and the check valve each having restoring springs matched to one another for these percentage values.

12. The circuit according to claim 3 wherein the actuating unit means comprises a piston-cylinder, the piston dividing the cylinder into two chambers which form the actuation sides of the actuating unit means.

* * * * *